Nov. 15, 1960 S. G. BEST 2,960,020
AIRCRAFT AIR CONDITIONER DISTRIBUTION SYSTEM
Filed Jan. 3, 1958
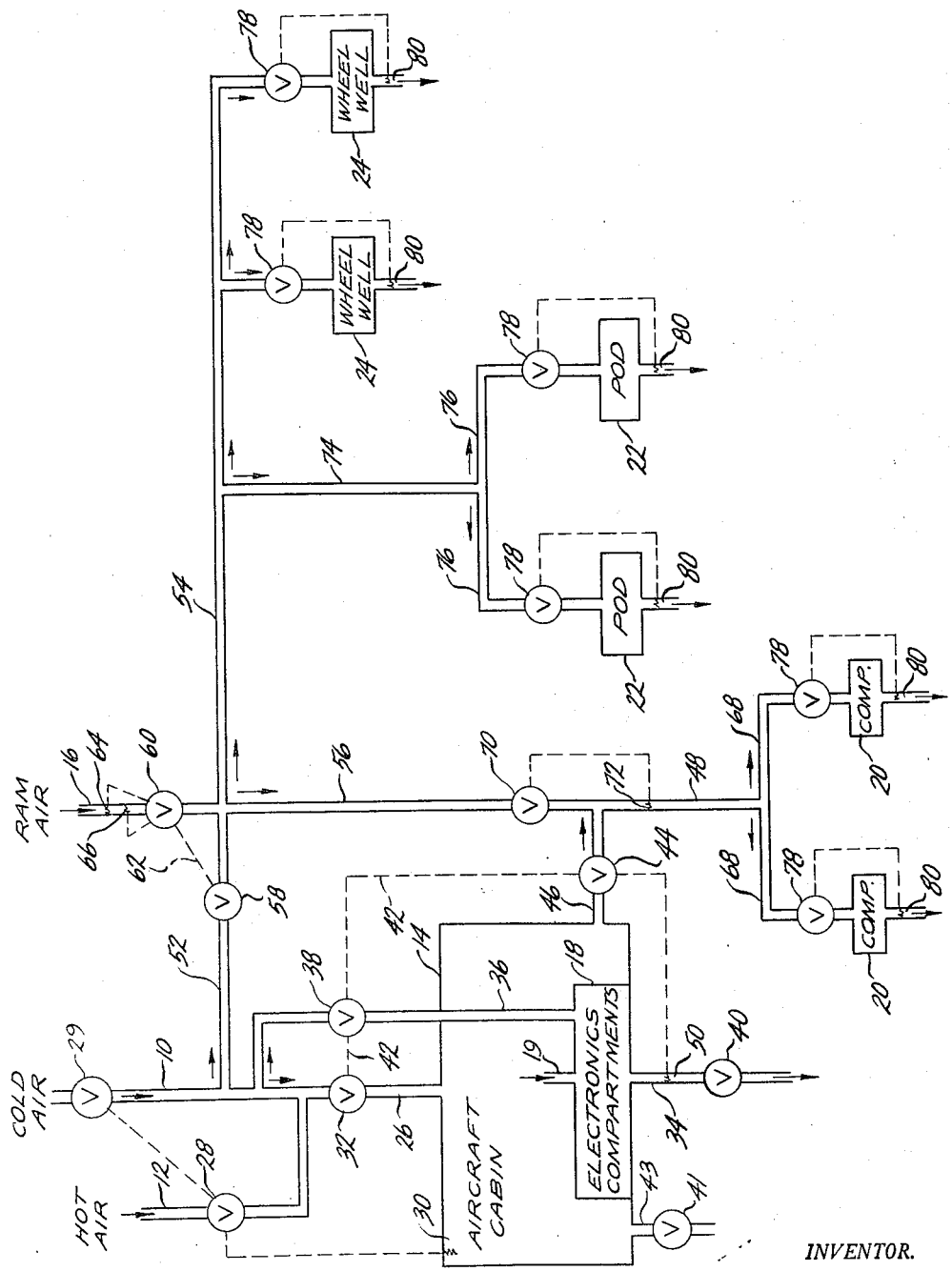
INVENTOR.
STANLEY G. BEST
BY
Teller & McCormick
ATTORNEYS

# United States Patent Office 2,960,020
Patented Nov. 15, 1960

2,960,020

AIRCRAFT AIR CONDITIONER DISTRIBUTION SYSTEM

Stanley G. Best, Manchester, Conn., assignor to United Aircraft Corporation, East Hartford, Conn., a corporation of Delaware Filed Jan. 3, 1958, Ser. No. 707,000

10 Claims. (Cl. 98—1.5)

This invention relates to improvements in aircraft air conditioning and, more specifically, to an improved distribution system for directing air to the cabin and various other compartments of an aircraft which require air conditioning.

It is the general object of the invention to provide a system for distributing air in a manner which insures the most effective utilization of cooling air in the supply of an aircraft cabin, one or more compartments within the cabin, and to a plurality of compartments and devices located externally of the cabin.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing is a schematic illustration of the distribution system and of the aircraft components which it serves.

In providing air conditioning for an aircraft, it is conventional practice to bleed air from the aircraft engine compressor to supply the air conditioning system. A portion of the engine bleed air is refrigerated and the remainder of the engine bleed air is mixed with the cold or refrigerated air before introduction to the cabin. The present invention is not primarily concerned with the manner or means of handling the engine bleed air so that a portion of it is cooled and so that another portion is delivered at a high temperature and, therefore, it is necessary for an understanding of the present invention to show only a cold air supply line 10 and a hot air supply line 12 for the aircraft cabin 14.

Another means for providing pressurized cooling air for an air conditioning system is to utilize air scoops, etc., for the purpose of delivering ram air to the system. The system of distributing the air provided in accordance with the present invention contemplates the use of ram air introduced through a conduit 16 as well as the use of cold air and hot air introduced through the conduits 10 and 12.

In addition to supplying air for conditioning the aircraft cabin 14, the distribution system provided herein supplies air for the cooling requirements of one or more compartments disposed within the cabin such as the compartment 18, the said compartment being supplied with cooling air from the cabin in the embodiment of the invention shown through connecting air passage means comprising a compartment inlet conduit 19. The distribution system also supplies air for the cooling requirements of aircraft compartments and devices disposed outside the cabin such as a plurality of compartments 20, 20 which may comprise compartments of the fuselage, a plurality of compartments or pods 22, 22 external of the fuselage, and a plurality of wheel wells 24, 24 which are also externally located.

The necessity of providing temperature and pressure conditioned air to aircraft cabins for the comfort and safety of occupants has long been recognized, and present air conditioning systems and air distribution systems have fulfilled the necessary requirements for cabin air conditioning. However, the necessity to provide cooling air streams to other compartments of the fuselage, to pods or compartments located externally of the fuselage, and to the aircraft wheel wells and the like has only recently arisen with the advent of superspeed aircraft. Without cooling at the compartments and devices external of the cabin, structural damage caused by overheating at high speed flight will result. With the added requirements for air cooling, new problems have been encountered in the design and construction of air distribution systems which will provide the necessary cooling without overloading the air supply system to the point where aircraft engine operating efficiency suffers an unacceptable loss.

The system of air distribution provided in accordance with the present invention is designed to reduce the supply load needed for air conditioning the external compartments and devices in addition to cooling or air conditioning the aircraft cabin. The distribution system provided herein contemplates the use of cold air supplied by the engine compressor for cooling the aircraft cabin and also for cooling the external compartments and devices, but this system also contemplates the use of ram air to supplement or to replace the compressor supply for cooling the external compartments in an integrated distribution system.

As will be quite apparent from the drawing, the entire air supply for the cabin is furnished by the engine compressor supply system, the cold air line 10 and the hot air line 12 being connected to a cabin inlet conduit 26. A valve 32 is disposed in the cabin inlet conduit 26 and may, for the present, be assumed to be in the full open condition, the operation of said valve being more fully explained hereinafter. In accordance with conventional practice, means are provided for controlling the flow of cold air from the refrigeration apparatus through the conduit 10 and for controlling the flow of hot air from the engine compressor through the conduit 12. Said means may comprise a modulating valve 28 disposed in the hot air conduit 12 and a second modulating valve 29 disposed in the cold air conduit 10, the valves 28 and 29 being preferably ganged or mechanically interconnected and their operation being coordinated such that the proper amounts of hot and cold air are introduced to the cabin 14 through the conduit 26 so as to maintain a desired temperature within said cabin. In preferred form, the valves 28 and 29 are controlled so as to be positioned automatically responsive to temperature within the cabin. That is, a temperature sensitive or responsive control element 30 is located within the cabin 14 to control suitable actuators for the valves. If electrically operable valves are employed, the element 30 may comprise a temperature sensitive resistor or "thermistor" connected in a bridge network so that an unbalance signal from the bridge network can be amplified to operate solenoids or other electrically operable means in the valves 28 and 29. If the valves are pneumatically operated, the temperature sensitive element 30 may comprise a temperature-pressure transducer which controls the operation of pneumatic valve actuators. The present invention does not relate to improvements in temperature sensing means or in valve operating means and, therefore, no specific or detailed showing has been made of such temperature sensing or valve operating means.

Under some anticipated conditions of aircraft operation, the cabin may require heating and under other conditions, a flow of cooling air may be needed and under still other anticipated conditions, the temperature within the cabin may be suitable for the comfort and safety of the occupants without the aid of conditioned air. Because of the possibility that, as a result of these last mentioned conditions of operation, no air will flow to the cabin at times and since there always exists a need for some nominal flow of air for ventilation and for pressurization, it is the usual practice to provide means for maintaining a minimum flow to the cabin at all times and under all conditions. This may be accomplished, for example, by providing a stop means for limiting the closing movement of the valve 29 such that a preselected minimum flow to the cabin 14 will always be provided through the cold air conduit 10 and the inlet conduit 26.

When heating is required, the desired temperature within the cabin 14 is maintained by the valve 28 opening as necessary for the flow of hot air from the conduit 12 through the conduit 26 to the said cabin. If, on the other hand, the cabin requires a flow of cooling air, the valve 28 will be urged in the closing direction whereby to decrease and finally to halt the flow of hot air from the conduit 12 and the valve 29 will be moved in the opening direction whereby to increase the flow of cooling air from the cold air conduit 10. It is to be expected that under the majority of aircraft operating conditions, cooling will be required for the aircraft cabin and it may therefore be assumed that in most instances the valve 28 in the hot air conduit 12 will be fully closed and the valve 29 in the cold air conduit 10 will be either partially or wholly open.

The air admitted to the cabin 14 from its inlet conduit 26 also supplies the compartment 18 or a plurality of such compartments located within the cabin 14 and which must be air cooled. Such compartments may be cabinets or the like containing electronic apparatus which causes heating. The air is discharged from the internal compartment or compartments and from the cabin 14 in a discharge conduit 34. Thus, it will be seen that the cabin 14 and internal compartment 18 are connected in series for flow of a cooling air stream therethrough.

In accordance with the present invention, the cabin 14 and the internal compartment 18 are also connected in parallel for the flow of a cooling air stream therethrough. A conduit 36 communicates with the cold air conduit 10 upstream of the junction of the cold air conduit 10 with the hot air conduit 12 and directs a second stream of cooling air flow past a valve 38 to the internal compartment 18. This cooling air is also discharged from the said internal compartment or compartments in the discharge conduit 34. A pressure regulating valve 40 is located in the discharge conduit 34 and is constructed and arranged to provide for flow overboard of the aircraft in accordance with a preselected schedule of aircraft cabin pressures. In accordance with conventional practice, a cabin safety valve 41, operable to provide for flow overboard of the aircraft so as to insure that cabin pressure does not exceed a maximum safe limit, is also provided and may be disposed in a cabin discharge conduit 43.

The valve 32 in the cabin inlet conduit 26 and the valve 38 in the parallel internal compartment inlet conduit 36 are preferably interconnected as indicated schematically by the line 42 and the two valves 32 and 38 are, in turn, preferably operatively interconnected with a third valve 44 disposed in a cabin discharge conduit 46. Air is discharged directly from the cabin 14 in the conduit 46, in contra-distinction with the first above described discharge path wherein flow through the internal compartment 18 precedes discharge in the conduit 34. In accordance with the present invention, air discharged from the cabin 14 through the conduit 46 may be directed into a conduit 48 for distribution to some or all of the compartments and devices external of the cabin 14. The conduit 48 may be considered an extension or part of the cabin discharge conduit 46.

While the three valves 32, 38 and 44 are preferably interconnected, their operation is in any event coordinated to control the temperature within the internal compartment 18 so as to maintain said temperature below a preselected maximum level and the said valves are also operated to permit cabin air to be discharged in the conduit 46 for cooling the externally located compartments whenever the internal compartment temperature is below said preselected maximum level. The valves 32, 38 and 44 are preferably of the modulating type and, preferably, automatic operating means is provided therefor for response to temperature at the discharge of the internal compartment 18. That is, a temperature responsive element 50 is located in the discharge conduit 34 and is preferably operable to control suitable actuating means for the valves 32, 38 and 44.

Under conditions wherein a relatively large amount of cooling air is flowing to the cabin 14, more than is necessary to maintain the temperature of air within the internal compartment 18 below the maximum level, the valve 38 will be closed and the valve 44 will be opened whereby some of the cabin air is diverted from flowing through the compartment 18 and is directed through the conduits 46 and 48 to the external compartments 20, 20. It will be apparent that by so diverting the flow of excess cooling air from the compartment 18, the cooling capacity of the air may be more fully utilized prior to discharge of said air overboard of the aircraft. An additional benefit is derived in that the possibility of overcooling the compartment 18 is thereby obviated and, further, a somewhat constant temperature may be maintained within said compartment whereby the operation of devices contained therein may be made more efficient and reliable especially in the case where such devices are of the electronic type.

If the temperature within the internal compartment 18 exceeds the preselected maximum level, the valve 44 should be moved to the closed position, and in the preferred construction described, the temperature responsive element 50 is operative to control the actuating means for the valve 44 so as to cause closing thereof. If the valve 44 is moved to its fully closed position and the temperature in the compartment 18 continues to exceed the maximum level, the valve 38 will commence to open thereby permitting the flow of cooling air from the cold air conduit 10 through the conduit 36 and directly to the compartment 18. If the valve 38 in the conduit 36 fully opens and the temperature of air within the compartment 18 continues to exceed the maximum level, the valve 32 will begin to close so as to restrict the flow of cooling air through the conduit 26 and thereby make available additional cooling air from the conduit 10 for flow through the conduit 36 to the compartment 18. It is to be noted, at this point, that as the valve 38 opens and the valve 32 closes diverting flow of cooling air from the cabin 14 to the electronic compartment 18, the temperature within said cabin will commence to rise. This, of course, results in further opening of the valve 29 whereby additional cooling air is made available to meet the cooling requirements of the cabin and the internal compartment 18.

It will be apparent from the above description of operation that in the embodiment of the invention shown, the coordinated operation of the valves 32, 38 and 44 is predicated on the principle that cooling of the internal compartment 18 is of primary importance. The invention is not to be construed as being so limited, however, various other modes of operation of the valves 32, 38 and 44 being contemplated, as for example, the mode of operation whereby said valves function to insure cooling of the cabin 14 under all conditions of aircraft flight and where cooling of the internal compartment 18 is relegated to a position of secondary importance. The essential feature of the coordinated operation of the valves 32, 38 and 44, with respect to the present invention, is that cooling air not be discharged overboard of the aircraft in a condition wherein it retains some useful cooling capacity. That is, cooling air should not be discharged overboard of the aircraft at a temperature which is significantly lower than the preselected maximum temperature limit of any of the aircraft compartments or devices which require cooling.

The distribution system for the compartments, etc., which are outside the aircraft cabin, is arranged to receive a supply from the cold air conduit 10 or from the ram air conduit 16 as well as from the cabin discharge conduit 46. As shown in the drawing, a conduit 52 is connected with the cold air supply conduit 10 and it and the ram air supply conduit 16 are connected to a conduit 54 which extends to the pods 22, 22 and the wheel wells 24, 24. The conduits 52 and 16 are also connected to a conduit 56 which is in communication with the cabin discharge conduit 46 and with the conduit 48 extending to the other compartments located externally of the cabin 14. A valve 58 is located in the cold air conduit 52 and a valve 60 is located in the ram air supply conduit 16, the said valves being preferably ganged or interconnected as indicated schematically by the line 62 and in any event their operation is coordinated so that when one of the valves is opened, the other is closed. Preferably, the valves 58 and 60 are automatically operated responsive to ram air pressure and temperature. That is, a temperature sensitive device 64 and a pressure sensitive device 66 are located in the ram air line 16 upstream of the valve 60 and are operatively associated with suitable valve actuating means which will open the valve 60 only when ram air pressure attains or exceeds a preselected minimum level and only when the ram air temperature is at or below a preselected level. Thus, the valve 60 opens to admit ram air to the distribution system whereby to close the valve 58 to the supply of cold air to the distribution system when the ram air is sufficiently cool and at a high enough pressure for the requirements of the distribution system to the wheel wells and various compartments located externally of the aircraft cabin. When ram air is not sufficiently cool or when it has not attained sufficient pressure, the valve 58 will be opened and the valve 60 closed to supply cold air from the engine compressor cold air supply conduit 10 for distribution to the wheel wells and external compartments.

As mentioned heretofore, it is an important feature of the distribution system of this invention that air discharged from the cabin can be used to supplement the flow from the cold air conduit or from the ram air line to at least some of the external compartments and devices and, under certain conditions, cabin discharge air can be used in lieu of air from the cold air conduit or from the ram air conduit. In accordance with this aspect of the invention, the conduit 48 is connected with the cabin discharge conduit 46 and extends to the branch conduits 68, 68 which communicate with the external compartments 20, 20. In further accord with this aspect or feature of the invention, a modulating valve 70 is disposed in the conduit 56 which receives air from either the cold air conduit 52 or the ram air conduit 16 and communicates with the cabin discharge conduit 46 and the external compartment supply conduit 48. The valve 70 is located in the conduit 56 upstream of the union of the said conduit with the conduits 44 and 48 and is always provided with a supply of cooling air through the conduit 56, one or the other of the valves 58 and 60 being open at all times as stated. Said valve is operative in response to the pressure of the air in the external compartment supply conduit 48. That is, a pressure element 72 is disposed in the conduit 48 and controls the operation of the valve 70 so as to provide a preselected minimum pressure of the air in the conduit 48. That is, the valve 70 is opened in response to a signal from the element 72 and air flows through the conduit 56 from the cold air conduit 10 or from the ram air conduit 16 to supplement or to supplant the cabin discharge air supplied through the conduit 46 when the preselected minimum pressure is not provided in the conduit 48 by such cabin discharge air. Thus, a preselected minimum air pressure is always maintained in the conduit 48 for distribution to the compartments 20, 20. Under certain anticipated operating conditions, sufficient air will be discharged from the cabin 14 through the conduit 46 to maintain the air pressure in the conduit 48 above the aforesaid minimum pressure level and the entire supply for distribution to the compartments 20, 20 will be received from the cabin discharge conduit. Under these conditions of operation, the element 72 will cause the valve 70 to be fully closed to reduce or eliminate the drain from the cold air conduit 10 or from the ram air conduit 16, thus enhancing overall aircraft operating efficiency.

It will be observed that in the embodiment of the invention shown, the pods 22, 22 and the wheel wells 24, 24 are supplied with air from the cold air conduit 10 or from the ram air conduit 16 through the conduit 54, the conduit 74 extending therefrom to the branch pod supply conduits 76, 76. In an alternative form of air distribution falling within the scope of this invention, the supply conduit 54 to the pods 22, 22 and the wheel wells 24, 24 can be connected with the external compartments 20, 20 supply line 48 so that cabin discharge air from the conduit 46 may be directed to all of the external compartments and devices. It is also within the scope of the invention to arrange the conduits supplying the various external compartments and devices so as to provide a variety of other combinations wherein a greater or lesser number of compartments and devices are supplied with cooling air from the supply conduits 48 and 54 respectively. The individual and collective cooling requirements of all of the aircraft compartments and devices, both internally and externally located, will determine in each case the most effective arrangement.

It should also be observed that a valve 78 is preferably provided at the inlet for each wheel well, compartment and pod to shut off the air supply thereto. Preferably, each valve 78 is constructed and arranged to be closed at a preselected temperature when air cooling is not needed. A temperature sensitive element 80 associated with a suitable actuator for each valve 78 to control operation thereof may be located within the wheel well, compartment or pod being served or at a discharge port thereof as shown.

The invention claimed is:

1. An air distribution system for air conditioning an aircraft having a cabin and a first compartment connected therewith by air passage means and supplied with cooling air therefrom and also having at least one additional compartment external of the cabin which requires a cooling air stream, said system comprising a cold air supply conduit connected with the cabin, means for discharging air from said first compartment, a ram air supply conduit connected with the external compartment, temperature and pressure responsive means in said ram air conduit, a connecting conduit between the cold air and the ram air conduits, a valve in the connecting conduit and a valve in the ram air conduit on the upstream side of the connecting conduit and the downstream side of said temperature and pressure responsive means, said valves being coordinated in their operation whereby one valve is opened when the other valve is closed and said valves being connected with and operable responsive to said temperature and pressure responsive means whereby the ram air conduit valve opens and the connecting conduit valve closes when the temperature in said ram air conduit is below a preselected level and the pressure is above a preselected level, and a cabin air discharge conduit connected between the cabin and said external compartment.

2. An air distribution system for air conditioning an aircraft having a cabin and a first compartment supplied with cooling air from said cabin and at least one additional compartment external of the cabin which requires a cooling air stream, said system comprising a supply conduit for the cabin which is connectible with a pressurized source of conditioned air, a valve in said supply conduit, a supply conduit for said first compartment connected with said cabin supply conduit upstream of said valve, a valve in said first compartment supply conduit, a cabin air discharge conduit connected between the cabin and said external compartment, a valve in said discharge conduit, and means for discharging air from said first compartment, said valves being coordinated for sequential operation for maintaining a preselected maximum temperature level in said first compartment whereby said discharge conduit valve closes and said first compartment supply conduit valve opens and said cabin supply conduit valve closes upon the occurrence of temperatures within said first compartment in excess of said preselected level.

3. An air distribution system for air conditioning an aircraft having a cabin and a first compartment supplied with cooling air from said cabin and at least one additional compartment external of the cabin which requires a cooling air stream, said system comprising a first cold air supply conduit connected with the cabin, a valve in said cabin cold air supply conduit, a supply conduit for said first compartment connected with said cabin supply conduit upstream of said valve, a valve in said first compartment supply conduit, a discharge conduit for said first compartment, a valve in said discharge conduit for regulating the pressure of air within said first compartment and thereby the pressure of air within said cabin, a cabin air discharge conduit connected between the cabin and said external compartment, a valve in said cabin discharge conduit, a second cold air supply conduit connected with said cabin air discharge conduit downstream of said valve, a valve responsive to the pressure of air within said cabin air discharge conduit disposed in said second cold air supply conduit and operable to control air flow therethrough, said cabin cold air supply conduit valve and said first compartment supply conduit valve and said cabin discharge conduit valve being operable to control the temperature of air in said first compartment.

4. An air distribution system for air conditioning an aircraft having a cabin and a first compartment connected therewith by air passage means and supplied with cooling air therefrom and also having at least one additional compartment external of the cabin which requires a cooling air stream, said system comprising a supply conduit for the cabin which is connectible with a pressurized source of conditioned air, means for discharging air from said first compartment, a ram air supply conduit connected with the external compartment, a valve in the ram air conduit, a cabin air discharge conduit connected between the cabin and the external compartment, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, and means responsive to air pressure in said discharge conduit downstream of the valve therein operatively connected with said ram air valve so that said ram air valve opens to admit ram air to said additional compartment when the air pressure in said discharge conduit drops below a preselected level.

5. An air distribution system for air conditioning an aircraft having a cabin and a first compartment connected therewith by air passage means and supplied with cooling air therefrom and also having at least one additional compartment external of the cabin which requires a cooling air stream, said system comprising a first cold air supply conduit connected with the cabin, a valve in said cabin cold air supply conduit, a supply conduit for said first compartment connected with said first cold air supply conduit upstream of the valve therein, means for discharging air from said first compartment, a cabin air discharge conduit connected between the cabin and said external compartment, a valve in said discharge conduit, a second cold air supply conduit connected with said discharge conduit downstream of said valve, a valve in said second cold air supply conduit, means responsive to the temperature of air in said first compartment operatively connected with said discharge conduit valve so that said valve reduces air flow through said discharge conduit in response to an increase in temperature in said first compartment and increases flow through said conduit in response to decrease in said compartment temperature, said temperature responsive means also being operatively connected with said first cold air supply conduit valve so that said valve decreases the supply of cooling air to said cabin in response to an increase in temperature in said first compartment, and means responsive to air pressure in said cabin discharge conduit downstream of the valve therein operatively connected with said second cold air supply conduit valve so that said valve opens to admit cooling air from said second cold air conduit to said additional compartment when the air pressure in said discharge conduit drops below a preselected level.

6. An air distribution system for air conditioning an aircraft having a cabin and a first compartment connected therewith by air passage means and supplied with cooling air therefrom and also having one additional compartment external of the cabin which requires a cooling air stream, said system comprising a supply conduit for the cabin which is connectible with a pressurized source of conditioned air, a supply conduit for said first compartment connected with the cabin supply conduit, a valve in said first compartment supply conduit, means for discharging air from said first compartment, a ram air supply conduit connected with the external compartment, a valve in the ram air conduit, a cabin air discharge conduit connected between the cabin and said external compartment, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, said temperature responsive means also being operatively connected with said valve in said first compartment supply conduit so that said valve increases the supply of cooling air to said compartment in response to an increase in temperature in said compartment, and means responsive to air pressure in said discharge conduit downstream of the valve therein operatively connected with said ram air valve so that said ram air valve opens to admit ram air to said additional compartment when the air pressure in said discharge conduit drops below a preselected level.

7. An air distribution system for air conditioning an aircraft having a cabin and a first compartment connected therewith by air passage means and supplied with cooling air therefrom and also having at least one additional compartment external of the cabin which requires a cooling air stream, said system comprising a first cold air supply conduit connected with said cabin, means for controlling the flow of air in said cabin cold air supply conduit, a valve in said cabin supply conduit downstream of said flow controlling means, a supply conduit for said first compartment connected with said cabin cold air supply conduit upstream of said valve, a valve in said first compartment supply conduit, means for discharging air from said first compartment, a second cold air supply conduit connected with the external compartment, a valve in said second cold air supply conduit, a cabin air discharge conduit connected between the cabin and said external compartment, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, said temperature responsive means also being operatively connected with said first cold air supply conduit valve and said first compartment supply conduit valve so that said two valves respectively decrease the supply of cooling air to said cabin and increase the supply of cooling air to said first compartment in response to an increase in temperature in said first compartment, and means responsive to air pressure in said cabin discharge conduit downstream of the valve therein operatively connected with said second cold air supply conduit valve so that said valve opens to admit cooling air from said second cold air conduit to said additional compartment when the air pressure in said discharge conduit drops below a preselected level.

8. An air distribution system for air conditioning an aircraft having a cabin and a first compartment connected therewith by air passage means and supplied with cooling air therefrom and also having at least one additional compartment external of the cabin which requires a cooling air stream, said system comprising a cold air supply conduit connected with the cabin, means for discharging air from said first compartment, a ram air supply conduit connected with the external compartment, a connecting conduit between the cold air and ram air conduits, temperature and pressure responsive means in said ram air conduit, a valve in the connecting conduit and a valve in the ram air conduits on the upstream side of the connecting conduit and the downstream side of said temperature and pressure responsive means, said valves being coordinated in their operation whereby one valve is opened when the other valve is closed and said valves being connected with and operable responsive to said temperature and pressure responsive means whereby the ram air conduit valve opens and the connecting conduit valve closes when the temperature in said ram air conduit is below a preselected level and the pressure is above a preselected level, a second valve in the ram air conduit downstream of the connecting conduit, a cabin air discharge conduit connected between the cabin and the external compartment, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, and means responsive to air pressure in said discharge conduit downstream of the valve therein operatively connected with said second ram air valve so that said ram air valve opens to admit ram air to said additional compartment when the air pressure in said discharge conduit drops below a preselected level.

9. An air distribution system for air conditioning an aircraft having a cabin and a first compartment connected therewith by air passage means and supplied with cooling air therefrom and also having a plurality of additional compartments external of the cabin all of which require a cooling air stream, said system comprising a first cold air supply conduit connected with the cabin, means for discharging air from said first compartment, a second cold air supply conduit, a first feed conduit for some of said external compartments connected with said second cold air supply conduit, a second feed conduit for other of said external compartments connected with said second cold air supply conduit, a valve in said second cold air supply conduit between said first and second feed conduits, a cabin air discharge conduit connected between said cabin and said second cold air conduit on the downstream side of said valve, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, and means responsive to air pressure in said discharge conduit downstream of the valve therein operatively connected with said second cold air supply conduit valve so that said second cold air supply conduit valve opens to admit air from said second cold air supply conduit to said additional compartment when the air pressure in said discharge conduit drops below a preselected level.

10. An air distribution system for air conditioning an aircraft having a cabin and a first compartment connected therewith by air passage means and supplied with cooling air therefrom and also having a plurality of additional compartments external of the cabin all of which require a cooling air stream, said system comprising a first cold air supply conduit connected with the cabin, a valve in the first cold air conduit, a supply conduit for said first compartment connected with the cold air conduit upstream of said valve, a valve in said first compartment supply conduit, means for discharging air from said first compartment, a ram air supply conduit, a connecting conduit between the said first cold air supply and ram air conduits upstream of the valve in said cold air supply conduit, temperature and pressure responsive means in said ram air conduit, a valve in the connecting conduit and a valve in the ram air conduit on the upstream side of the connecting conduit and the downstream side of said temperature and pressure responsive means, said connecting conduit and ram air conduit valves being coordinated in their operation whereby one valve is closed when the other valve is opened and said valves being connected with and operable responsive to said temperature and pressure responsive means whereby the ram air valve opens and the connecting conduit valve closes when the temperature in said ram air conduit is below a predetermined level and the pressure therein is above a predetermined level, a first feed conduit for some of the external compartments connected with the ram air conduit on the downstream side of the valve therein, a second feed conduit for other of the external compartments connected with the ram air conduit on the downstream side of the valve therein, a second valve in the ram air conduit between said first and second feed conduits, a cabin air discharge conduit connected between the cabin and the ram air conduit on the downstream side of said second valve, a valve in said discharge conduit, means responsive to the temperature of air in said first compartment operatively connected with said discharge conduit valve so that said valve reduces air flow through said discharge conduit in response to an increase in temperature in said first compartment and increases flow through said conduit in response to a decrease in said compartment temperature, said temperature responsive means also being operatively connected with said first cold air supply conduit valve and said first compartment supply conduit valve so that said two valves respectively decrease the supply of cooling air to said cabin and increase the supply of cooling air to said first compartment in response to an increase in temperature in said first compartment, and means responsive to air pressure in said discharge conduit downstream of the valve therein operatively connected with said second ram air valve so that said valve opens to admit ram air to said additional compartment when the air pressure in said discharge conduit drops below a preselected level.

References Cited in the file of this patent
UNITED STATES PATENTS

| | | |
|---|---|---|
| 2,208,554 | Price | July 16, 1940 |
| 2,439,793 | Braddon | Apr. 20, 1948 |
| 2,463,487 | Widgery et al. | Mar. 1, 1949 |
| 2,772,621 | Arnoldi | Dec. 4, 1956 |
| 2,814,241 | Silver | Nov. 26, 1957 |